US011362854B2

(12) United States Patent
Higo et al.

(10) Patent No.: US 11,362,854 B2
(45) Date of Patent: Jun. 14, 2022

(54) INFORMATION PROCESSING APPARATUS, INFORMATION PROCESSING METHOD, PROGRAM, AND INFORMATION PROCESSING SYSTEM

(71) Applicant: Sony Corporation, Tokyo (JP)

(72) Inventors: Takuma Higo, Tokyo (JP); Ryo Sokabe, Saitama (JP); Koji Fujita, Tokyo (JP); Takashi Onohara, Tokyo (JP)

(73) Assignee: SONY CORPORATION, Tokyo (JP)

(*) Notice: Subject to any disclaimer, the term of this patent is extended or adjusted under 35 U.S.C. 154(b) by 211 days.

(21) Appl. No.: 15/667,541

(22) Filed: Aug. 2, 2017

(65) Prior Publication Data

US 2018/0062868 A1  Mar. 1, 2018

(30) Foreign Application Priority Data

Aug. 25, 2016 (JP) .............................. JP2016-165010

(51) Int. Cl.
*H04L 12/28* (2006.01)
*G06F 3/0488* (2022.01)
*G06F 3/04817* (2022.01)

(52) U.S. Cl.
CPC .......... *H04L 12/282* (2013.01); *G06F 3/0488* (2013.01); *G06F 3/04817* (2013.01); *H04L 12/2812* (2013.01); *H04L 12/2827* (2013.01); *H04L 2012/2849* (2013.01)

(58) Field of Classification Search
None
See application file for complete search history.

(56) References Cited

U.S. PATENT DOCUMENTS

| | | | |
|---|---|---|---|
| 9,548,008 B1* | 1/2017 | Manning | H02J 7/025 |
| 9,655,215 B1* | 5/2017 | Ho | H05B 45/10 |
| 9,712,359 B2* | 7/2017 | Snyder | H04L 27/2611 |
| 10,135,653 B2* | 11/2018 | Snyder | G08B 21/0202 |
| 11,226,734 B1* | 1/2022 | Dalmia | G06F 3/03545 |
| 11,227,686 B2* | 1/2022 | Makrinich | G16H 15/00 |
| 2004/0125044 A1* | 7/2004 | Suzuki | G06F 3/0346 |
| | | | 345/1.1 |
| 2006/0050142 A1 | 3/2006 | Scott et al. | |
| 2008/0313151 A1* | 12/2008 | Furumoto | G06F 16/2458 |
| 2012/0269424 A1* | 10/2012 | Ebata | G06T 7/50 |
| | | | 382/154 |

(Continued)

FOREIGN PATENT DOCUMENTS

| | | |
|---|---|---|
| JP | 2003-309736 | 10/2003 |
| JP | 2005-157419 | 6/2005 |

(Continued)

OTHER PUBLICATIONS

Official Action (with English translation) for Japanese Patent Application No. 2016165010, dated Oct. 20, 2020, 8 pages.

*Primary Examiner* — Dhairya A Patel
(74) *Attorney, Agent, or Firm* — Sheridan Ross P.C.

(57) ABSTRACT

There is provided an information processing apparatus including: an acquisition unit configured to acquire apparatus characteristic information output from a reproduction apparatus; and a generation unit configured to generate an image reflecting characteristics of the reproduction apparatus on the basis of the acquired apparatus characteristic information.

20 Claims, 11 Drawing Sheets

(56) References Cited

U.S. PATENT DOCUMENTS

| | | | | |
|---|---|---|---|---|
| 2013/0208980 | A1* | 8/2013 | Ono | H04N 1/40 |
| | | | | 382/165 |
| 2014/0091719 | A1* | 4/2014 | Tsai | H05B 47/19 |
| | | | | 315/185 S |
| 2015/0092035 | A1* | 4/2015 | Yamamoto | A61B 1/00188 |
| | | | | 348/68 |
| 2015/0207865 | A1* | 7/2015 | Hsieh | G06Q 10/109 |
| | | | | 715/716 |
| 2015/0242505 | A1* | 8/2015 | Uenoyama | G06F 16/951 |
| | | | | 707/722 |
| 2015/0305125 | A1* | 10/2015 | Chen | H05B 31/50 |
| | | | | 315/155 |
| 2016/0232131 | A1* | 8/2016 | Liu | G06Q 10/06 |
| 2016/0337497 | A1* | 11/2016 | Smith | H04W 12/06 |
| 2016/0359325 | A1* | 12/2016 | Kawata | G16H 50/20 |
| 2017/0092246 | A1* | 3/2017 | Manjarrez | G10H 1/0008 |
| 2017/0127499 | A1* | 5/2017 | Unoson | H04W 12/50 |
| 2017/0238401 | A1* | 8/2017 | Sadwick | H05B 47/195 |
| | | | | 315/294 |
| 2017/0287466 | A1* | 10/2017 | Lazzouni | G10L 15/10 |
| 2018/0007291 | A1* | 1/2018 | Ida | H04N 5/2258 |
| 2018/0041985 | A1* | 2/2018 | Davaadorj | G01S 5/0289 |
| 2018/0063249 | A1* | 3/2018 | Nguyen | H04L 67/42 |
| 2018/0077783 | A1* | 3/2018 | Sooch | H05B 47/16 |
| 2018/0144590 | A1* | 5/2018 | Mixter | G08B 5/36 |
| 2018/0160782 | A1* | 6/2018 | Wong | F04D 29/005 |
| 2018/0184152 | A1* | 6/2018 | Kirkpatrick | H04N 21/43635 |
| 2019/0005131 | A1* | 1/2019 | Kumar | H04N 21/26258 |
| 2019/0171666 | A1* | 6/2019 | McKenzie | H04N 21/8113 |
| 2019/0394858 | A1* | 12/2019 | Lal | H04L 12/2818 |
| 2021/0004965 | A1* | 1/2021 | Tung | G06T 7/12 |
| 2021/0316858 | A1* | 10/2021 | Pargoe | B64C 39/024 |
| 2021/0319189 | A1* | 10/2021 | Trehan | G06F 40/35 |

FOREIGN PATENT DOCUMENTS

| | | | | |
|---|---|---|---|---|
| JP | 2007-042118 | | 2/2007 | |
| JP | 2007-306088 | | 11/2007 | |
| JP | 2010-087605 | A | 4/2010 | |
| JP | 2012-227797 | | 11/2012 | |
| WO | WO-2013049346 | A1 * | 4/2013 | G06F 3/0482 |
| WO | WO 2016/103546 | A1 | 6/2016 | |

* cited by examiner

INFORMATION PROCESSING APPARATUS, INFORMATION PROCESSING METHOD, PROGRAM, AND INFORMATION PROCESSING SYSTEM

CROSS REFERENCE TO RELATED APPLICATIONS

This application claims the benefit of Japanese Priority Patent Application JP 2016-165010 filed Aug. 25, 2016, the entire contents of which are incorporated herein by reference.

BACKGROUND

The present disclosure relates to an information processing apparatus, an information processing method, a program, and an information processing system that can be applied to control of a reproduction apparatus.

There has been known a system in which a home network is established in a house and content such as music and video is reproduced by a reproduction apparatus connected to the home network. For example, WO 2016/103546 discloses a method of controlling multi-room reproduction in which a group is established by a plurality of reproduction apparatuses connected to a network, and the same content is simultaneously reproduced. By appropriately operating an image representing the state of the group displayed on a touch panel operated by a user, it is possible to newly create a group, dissolve the group, make a new addition to the group, withdraw from the group, and the like, with a good operability (see, for example, paragraphs 0043 to 0046 in the Specification, and FIGS. 3 to 17 of WO 2016/103546).

Further, Japanese Patent Application Laid-open No. 2010-87605 discloses a technique for displaying a standby image, a menu image, or the like suitable for the image of the design of a casing on the basis of the serial number of a portable electronic apparatus. With this, user's feeling of use and the operability of a menu screen are improved (see, for example, paragraphs 0047 to 0058 in the Specification, and FIGS. 6 to 9 of Japanese Patent Application Laid-open No. 2010-87605).

SUMMARY

It is expected that control of a reproduction apparatus via wireless communication such as network and Bluetooth (registered trademark) is frequently performed in the future, and therefore, a technology capable of improving the operability of a user is desired.

In view of the circumstances as described above, it is desirable to provide an information processing apparatus, an information processing method, a program, and an information processing system that are capable of controlling, with a good operability, a reproduction apparatus.

According to an embodiment of the present disclosure, there is provided an information processing apparatus includes an acquisition unit and a generation unit.

The acquisition unit is configured to acquire apparatus characteristic information output from a reproduction apparatus.

The generation unit is configured to generate an image reflecting characteristics of the reproduction apparatus on the basis of the acquired apparatus characteristic information.

In this information processing apparatus, an image reflecting the characteristics of a reproduction apparatus is displayed on the basis of apparatus characteristic information output from the reproduction apparatus. With this, it is possible to easily know a reproduction apparatus to be controlled and control, with a good operability, the reproduction apparatus.

The apparatus characteristic information may include a color of the reproduction apparatus. In this case, the generation unit may generate an icon of the reproduction apparatus, the icon reflecting the color of the reproduction apparatus.

With this, it is possible to easily know a reproduction apparatus to be controlled.

The generation unit may generate a GUI (Graphical User Interface) for controlling the reproduction apparatus, the GUI reflecting the color of the reproduction apparatus.

With this, it is possible to easily know a reproduction apparatus that is controlled via a GUI.

The generation unit may generate a control screen having a background color substantially the same as the color of the reproduction apparatus.

With this, it is possible to easily know a reproduction apparatus that is controlled by operating a control screen.

The apparatus characteristic information may include system information of the reproduction apparatus. In this case, the generation unit may generate an icon of the reproduction apparatus, the icon reflecting the system information of the reproduction apparatus.

With this, it is possible to easily know a reproduction apparatus to be controlled.

The system information may include information on a functional part constituting the reproduction apparatus. In this case, the generation unit may generate an icon of the reproduction apparatus, the icon reflecting the information on the functional part.

Since information on a functional part is reflected, it is possible to easily know a reproduction apparatus to be controlled.

The information on the functional part may include information on a speaker. In this case, the generation unit may generate an icon of the reproduction apparatus, the icon reflecting the information on the speaker.

Since information on a speaker is reflected, it is possible to easily know a reproduction apparatus to be controlled.

The generation unit may generate a predetermined image for the reproduction apparatus from which no apparatus characteristic information can be acquired.

With this, even in the case where no apparatus characteristic information is acquired, it is possible to display an icon or the like of a reproduction apparatus and maintain the high operability.

An information processing method according to an embodiment of the present disclosure is an information processing method executed by a computer system, the information processing method including acquiring apparatus characteristic information output from a reproduction apparatus.

An image reflecting characteristics of the reproduction apparatus is generated on the basis of the acquired apparatus characteristic information.

A non-transitory computer readable recording medium storing a program according to an embodiment of the present disclosure causes a computer system to execute the steps of:

acquiring apparatus characteristic information output from a reproduction apparatus; and generating an image reflecting characteristics of the reproduction apparatus on the basis of the acquired apparatus characteristic information.

An information processing system according to an embodiment of the present disclosure includes the reproduction apparatus and the information processing apparatus.

As described above, in accordance with the present disclosure, it is possible to control, with a good operability, a reproduction apparatus. It should be noted that the effects described here are not necessarily limitative and may be any effect described in the present disclosure.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present disclosure will be described with reference to the drawings.

[Content Reproduction System]

Figure 1:
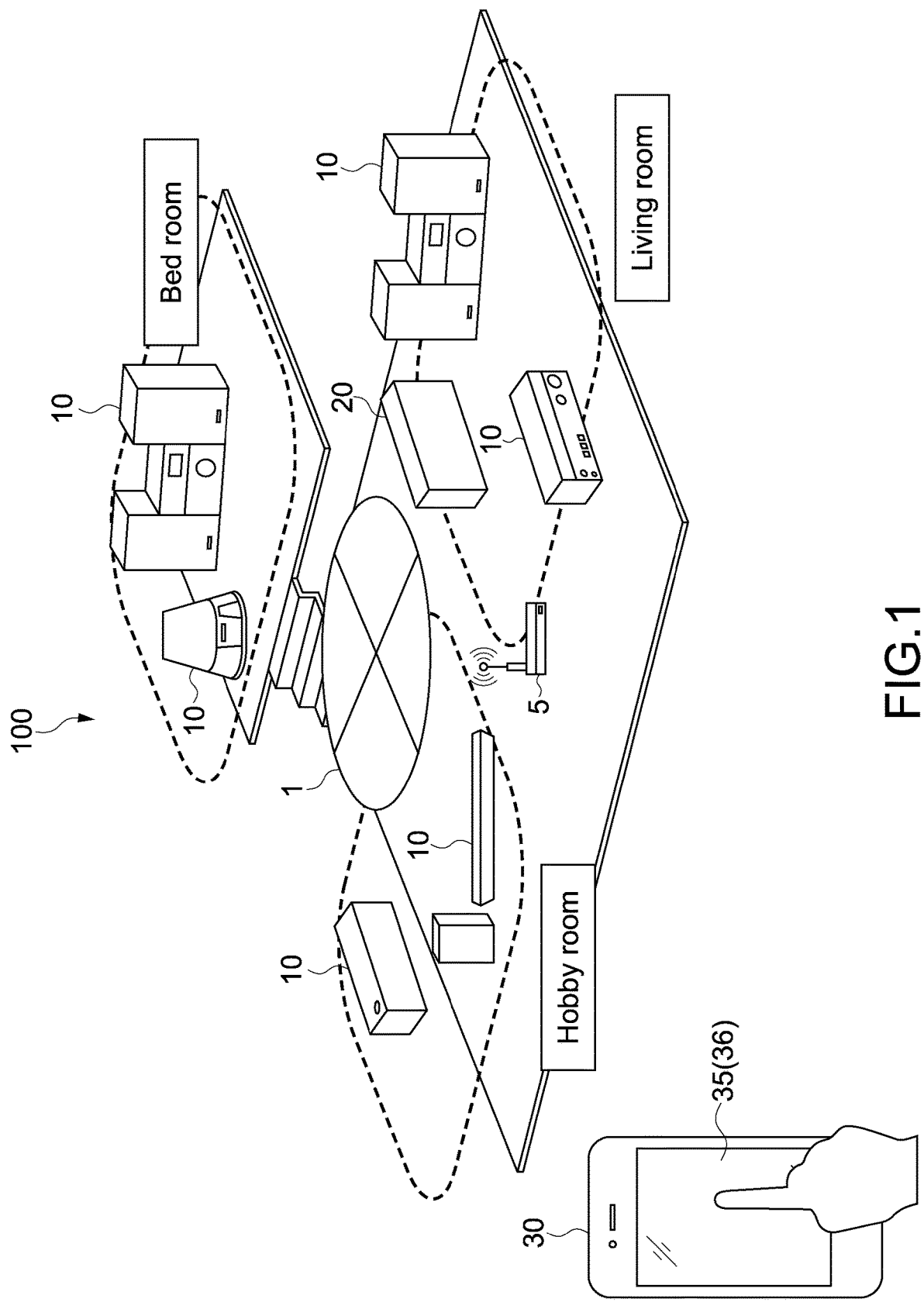
FIG. 1 is a schematic diagram showing a configuration example of a content reproduction system according to this embodiment.

FIG. 1 is a schematic diagram showing a configuration example of a content reproduction system as an information processing system according to an embodiment of the present disclosure. A content reproduction system 100 includes a home network 1 established in a house, a plurality of reproduction apparatuses 10 connected to the home network 1, a server apparatus 20 configured to provide content, and a portable terminal 30.

The plurality of reproduction apparatuses 10, the server apparatus 20, and the portable terminal 30 are connected to the home network 1 via an access point 5 through a wireless LAN communication such as WiFi. As the home network 1, a network conforming to DLNA (registered trademark) (Digital Living Network Alliance) standard is used, for example.

For example, the plurality of reproduction apparatuses 10 each function as a DMR (Digital Media Renderer), and the server apparatus 20 functions as a DMS (Digital Media Server). Further, the portable terminal 30 functions as a DMC (Digital Media Controller). Note that the present disclosure is applicable also to a case where a network using another protocol is established.

As shown in FIG. 1, the plurality of reproduction apparatuses 10 are placed in rooms, i.e., a living room, a hobby room, and a bed room. The portable terminal 30 transmits, to each reproduction apparatus 10, an instruction to acquire content from the server apparatus 20 and reproduce the acquired content, by using a control message of UPnP (Universal Plug and Play), for example.

Therefore, a user is capable of controlling the reproduction operation of the reproduction apparatus 10 placed in each room, by operating the portable terminal 30. Note that it is also possible to cause the reproduction apparatus 10 to reproduce content by using short-range wireless communication such as Bluetooth (registered trademark).

In this embodiment, music content is reproduced by the plurality of reproduction apparatuses 10. However, the present disclosure is not limited to reproduction of music content and is applicable to reproduction of various kinds of content such as video. Further, also the numbers of reproduction apparatuses 10, server apparatuses 20, and the like are not limited.

As the reproduction apparatus 10, for example, various CE (Consumer Electronics) apparatuses such as a television receiver, a PC (Personal computer), an audio video receiver, a video monitor, and a home game machine are used. In addition, the reproduction apparatus according to an embodiment of the present disclosure includes an in-car audio installed in a car, a headphone attached to a user, and the like.

As the server apparatus 20, for example, a PC, a network compliant HDD (NAS), or the like is used. As the portable terminal 30, a smartphone is typically used. Alternatively, various PDAs (Personal Digital Assistants) such as a tablet terminal may be used as the portable terminal 30. In addition, various computers can be used as the information processing apparatus according to an embodiment of the present disclosure.

[Configuration of Portable Terminal]

Figure 2:
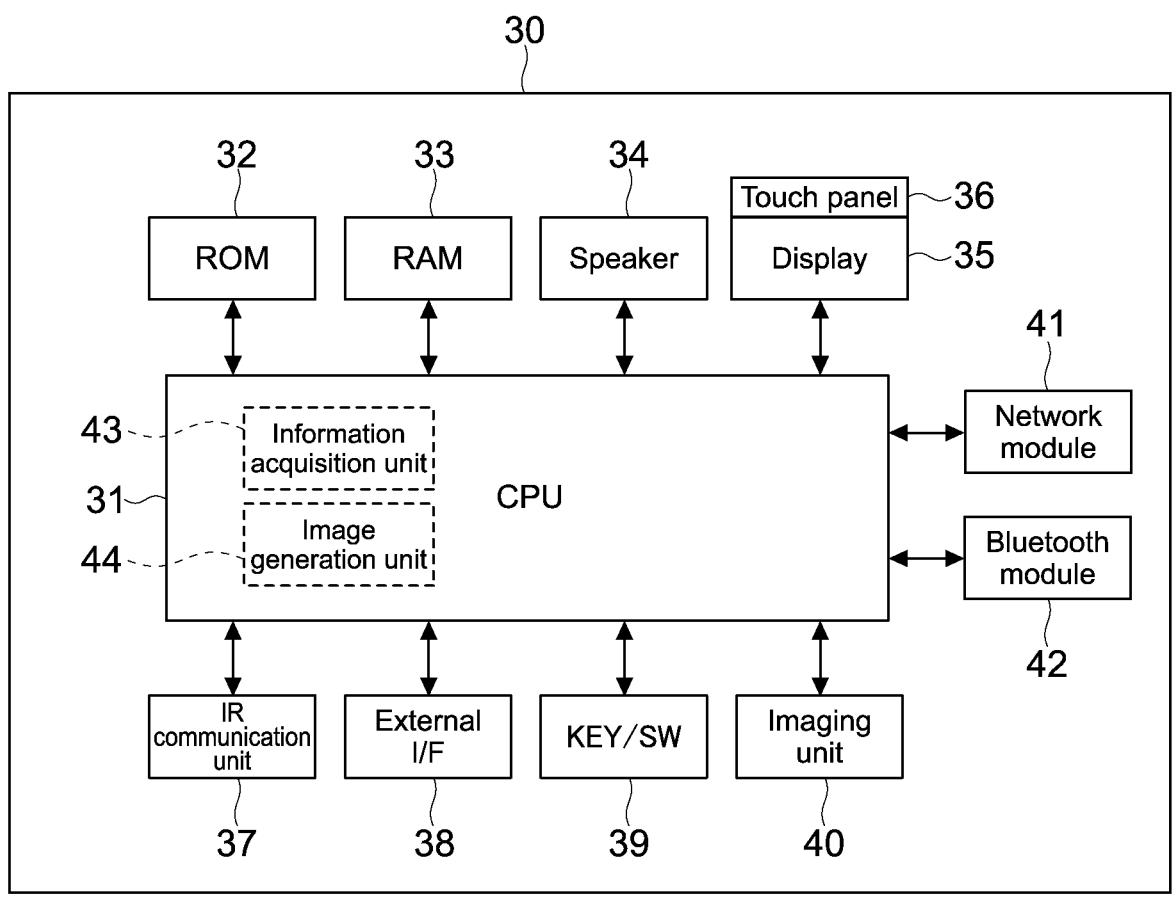
FIG. 2 is a block diagram showing a configuration example of a portable terminal.

FIG. 2 is a block diagram showing a configuration example of the portable terminal 30. The portable terminal 30 includes a CPU (Central Processing Unit) 31, a ROM (Read Only Memory) 32, a RAM (Random Access Memory) 33, a speaker 34, a display 35, and a touch panel 36. Further, the portable terminal 30 includes an infrared (IR) communication unit 37, an external I/F (interface) 38, a key/switch 39, and an imaging unit 40. Further, the portable terminal 30 includes a network module 41 and a Bluetooth module 42.

The CPU 31 transmits/receives signals to/from the respective blocks of the portable terminal 30 to perform various calculations, and collectively controls various kinds of processing executed by the portable terminal 30 such as instructing the reproduction apparatus 10 to reproduce content and displaying of a GUI (Graphical User Interface) on the display 35 (touch panel 36).

The ROM 32 stores various kinds of data processed by the CPU 31, such as various kinds of image data and metadata, and various programs such as applications. The RAM 33 is used as a work area of the CPU 31. When a program such as an application is executed, various kinds of data necessary for the execution are read into the RAM 33.

Instead of or in addition to the ROM 32, a non-volatile memory such as an HDD (Hard Disk Drive), a flash memory, and other solid-state memory may be provided. The above-mentioned various kinds of data and programs may be stored in these storage devices.

The speaker 34 outputs reproduction of music content, a voice guide to a user, and the like. The display 35 is a display device using liquid crystal, EL (Electro-Luminescence), or the like, and displays various GUIs and the like. As shown in FIG. 2, the display 35 is formed integrally with the touch panel 36.

The IR communication unit 37 is a module for executing IR communication with an external apparatus. The external I/F 38 is an interface for connecting to the external apparatus on the basis the USB standard, HDMI (registered trademark) (High-Definition Multimedia Interface) standard, or the like.

The key/switch 39 accepts, particularly, a user's operation that cannot be input via the touch panel 36, such as a power supply switch and a shortcut key. The imaging unit 40 includes a CMOS (Complementary Metal Oxide Semiconductor) sensor, a CCD (Charge Coupled Devices) sensor, and the like, and generates a digital image of an object.

The network module 41 is an interface for connecting to the home network 1, and a wireless LAN module such as WiFi is used as the network module 41, for example. Operation of the network module 41 enables wireless communication with the reproduction apparatus 10 and the server apparatus 20.

The Bluetooth module 42 is a module for executing short-range wireless communication conforming to the Bluetooth standard with each of the plurality of reproduction apparatuses 10. In this embodiment, it is possible to execute communication conforming to the BLE (Bluetooth Low Energy) standard (BLE communication) and short-range wireless communication conforming to the Classic Bluetooth standard (BT communication).

In this embodiment, it is possible to control the operation of the reproduction apparatus 10 via the BLE communication and the BT communication. For example, it is also possible to control the operation of a non-network compliant reproduction apparatus that is not connected to the home network 1 via short-range wireless communication such as the BLE communication. Note that the present disclosure is applicable to short-range wireless communication conforming to another arbitrary standard.

Information processing by the portable terminal 30 having the hardware configuration as described above is realized by cooperation of software stored in the ROM 32 and the like and hardware resources of the portable terminal 30. For example, the CPU 31 loads the program (application) according to an embodiment of the present disclosure, which is stored in the ROM 32 or the like, into the RAM 33 and executes the program, thereby realizing the information processing method according to an embodiment of the present disclosure.

As shown in FIG. 2, in this embodiment, an information acquisition unit 43 and an image generation unit 44, which are functional blocks, are realized by the CPU 31 executing a predetermined program. In order to realize these blocks, dedicated hardware such as an IC (integrated circuit) may be appropriately used.

A program such as an application is installed in the portable terminal 30 from a global network, for example. Alternatively, the program may be installed in the portable terminal 30 via a recording medium.

[Reproduction of Content]

Figure 3:
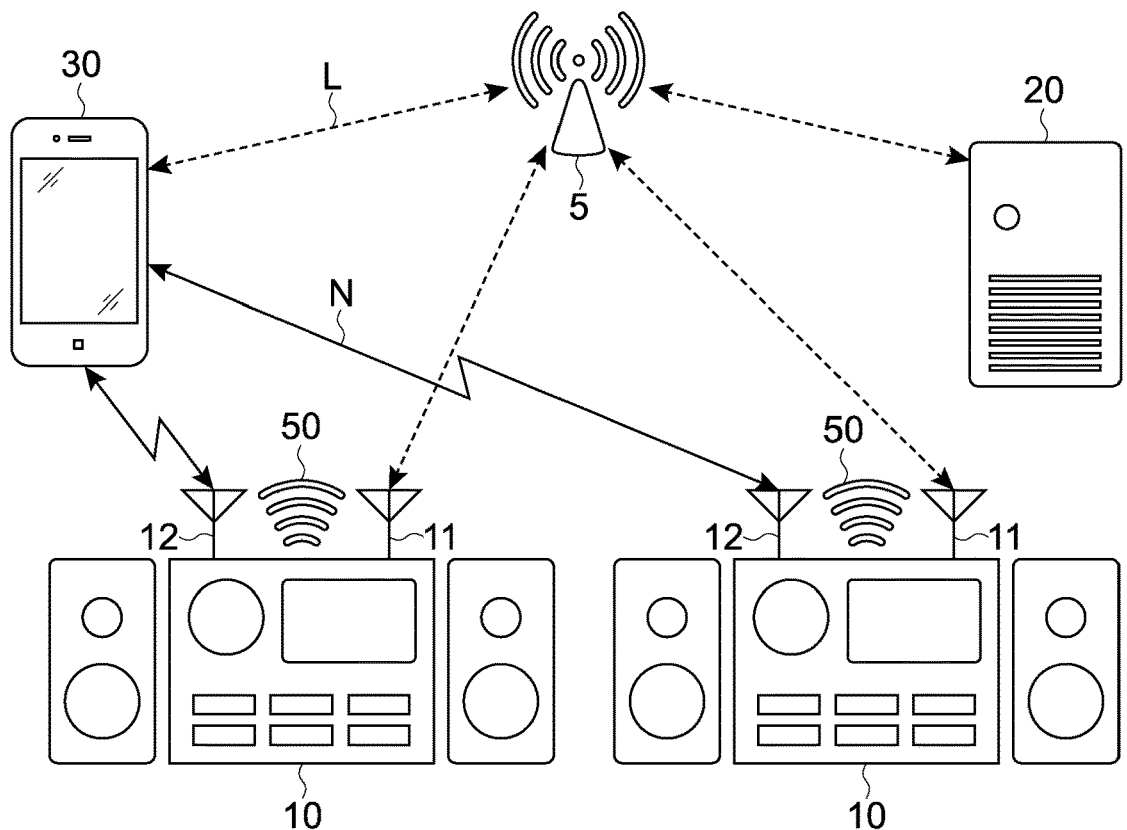
FIG. 3 is a diagram schematically showing a connection form between a plurality of reproduction apparatuses, a server apparatus, and a portable terminal.

FIG. 3 is a diagram schematically showing a connection form between the plurality of reproduction apparatuses 10, the server apparatus 20, and the portable terminal 30. Note that in each of the plurality of reproduction apparatuses 10, a network module 11 and a Bluetooth module 12 are provided.

As described above, the plurality of reproduction apparatuses 10, the server apparatus 20, and the portable terminal 30 can be connected to each other via the access point 5 through wireless LAN communication (arrow L in broken lines). By transmitting a control message or the like, the portable terminal 30 is capable of controlling the operation of reproducing content by the reproduction apparatus 10.

Further, the portable terminal 30 can be directly connected to each reproduction apparatus 10 through the BLE communication or the like (arrow N in a solid line). It is possible to control the reproduction operation by the reproduction apparatus 10 through the BLE communication or the like. Further, the Bluetooth module 12 of each reproduction apparatus 10 outputs a beacon signal 50. The beacon signal includes apparatus information such as the model number of the reproduction apparatus 10, and a unique ID such as a Bluetooth address.

In this embodiment, it is possible to perform synchronous reproduction of content (multi-room reproduction) in which the same content is reproduced by synchronizing the plurality of reproduction apparatuses 10. The synchronous reproduction of content is realized by synchronizing the reproduction operations by the plurality of reproduction apparatuses 10 to each other. For example, an instruction for synchronous reproduction is transmitted to each of the plurality of reproduction apparatuses 10 that are to perform synchronous reproduction. Alternatively, content may be synchronously distributed from one reproduction apparatus 10 among the plurality of reproduction apparatuses 10 to another reproduction apparatus 10.

[Generation of Icon and GUI]

Figure 4:
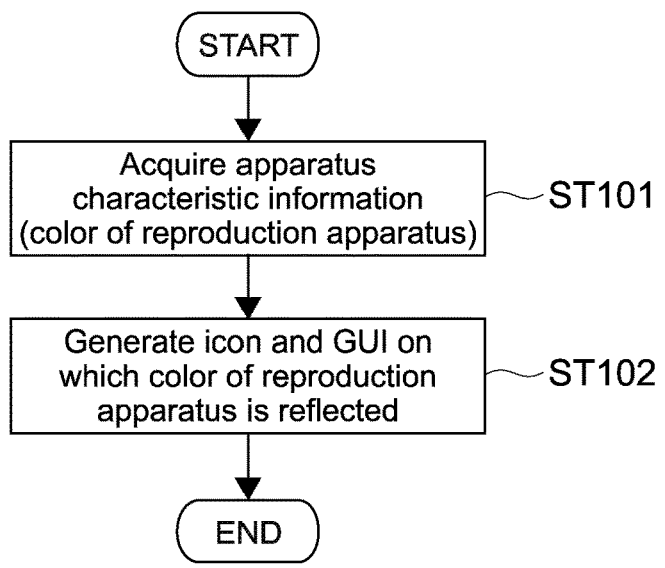
FIG. 4 is a flowchart showing an example of generation of an icon and a GUI for controlling a reproduction apparatus.

FIG. 4 is a flowchart showing an example of generation of an icon and a GUI for controlling the reproduction apparatus 10 according to this embodiment.

First, the information acquisition unit 43 shown in FIG. 2 acquires apparatus characteristic information output from the reproduction apparatus 10 (Step 101). The apparatus characteristic information is acquired via the BLE communication, the BT communication, or the home network 1. In the example shown in FIG. 4, the color of the reproduction apparatus 10 is output as the apparatus characteristic information. Typically, the color of the reproduction apparatus 10 corresponds to the exterior color of a casing or the like constituting the reproduction apparatus 10. Alternatively, a color applied to a characteristic portion of the reproduction apparatus 10 may be output as the color of the reproduction apparatus 10.

An image reflecting the characteristics of the reproduction apparatus 10 is generated by the image generation unit 44 on the basis of the acquired apparatus characteristic information. In this embodiment, an icon of the reproduction apparatus 10 and various GUIs for controlling the reproduction apparatus 10 on which the color of the reproduction apparatus 10 is reflected are generated (Step 102).

Figure 5:
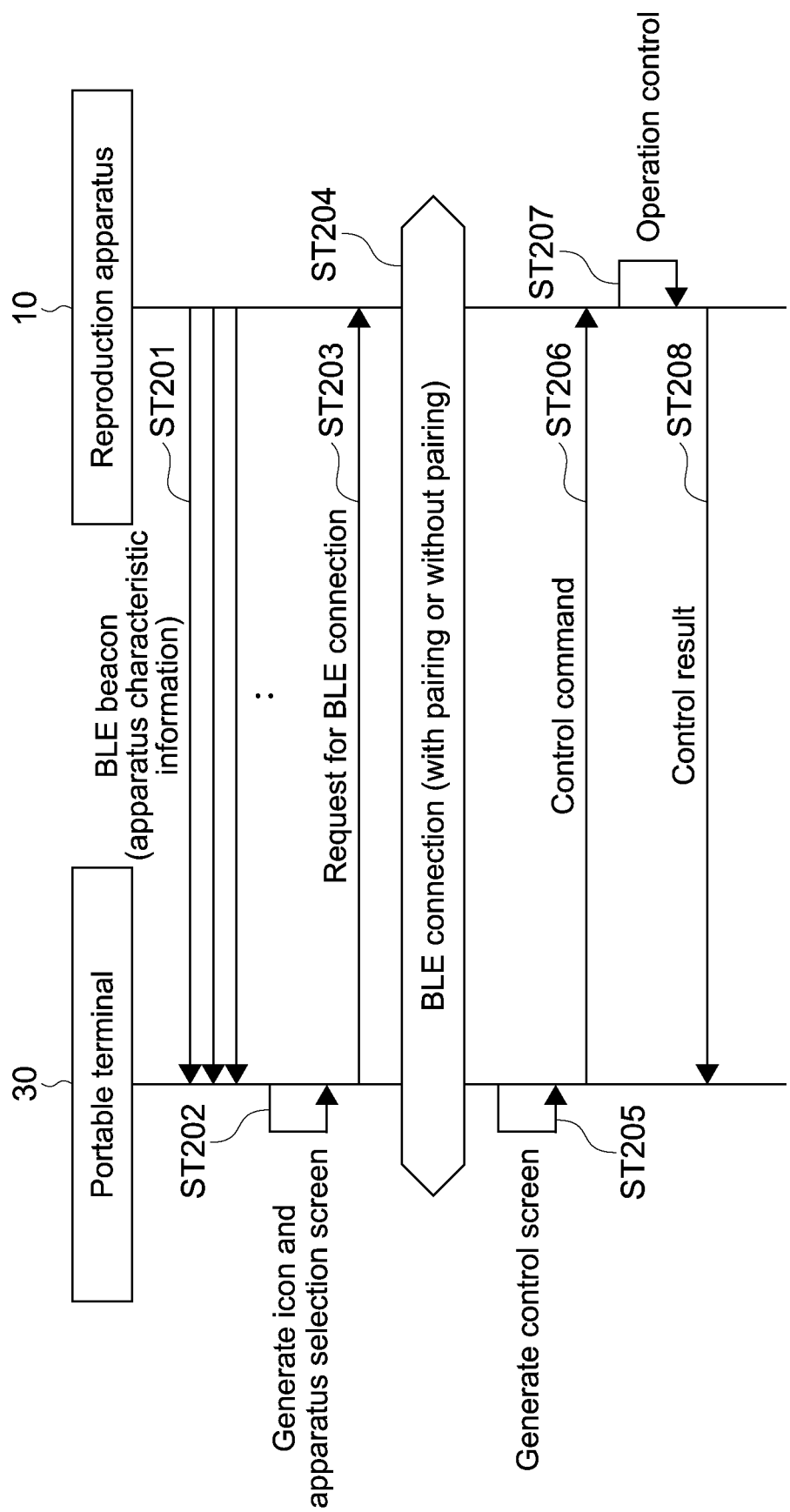
FIG. 5 is a sequence diagram showing an example of acquisition of apparatus characteristic information via BLE communication.
Figure 6:
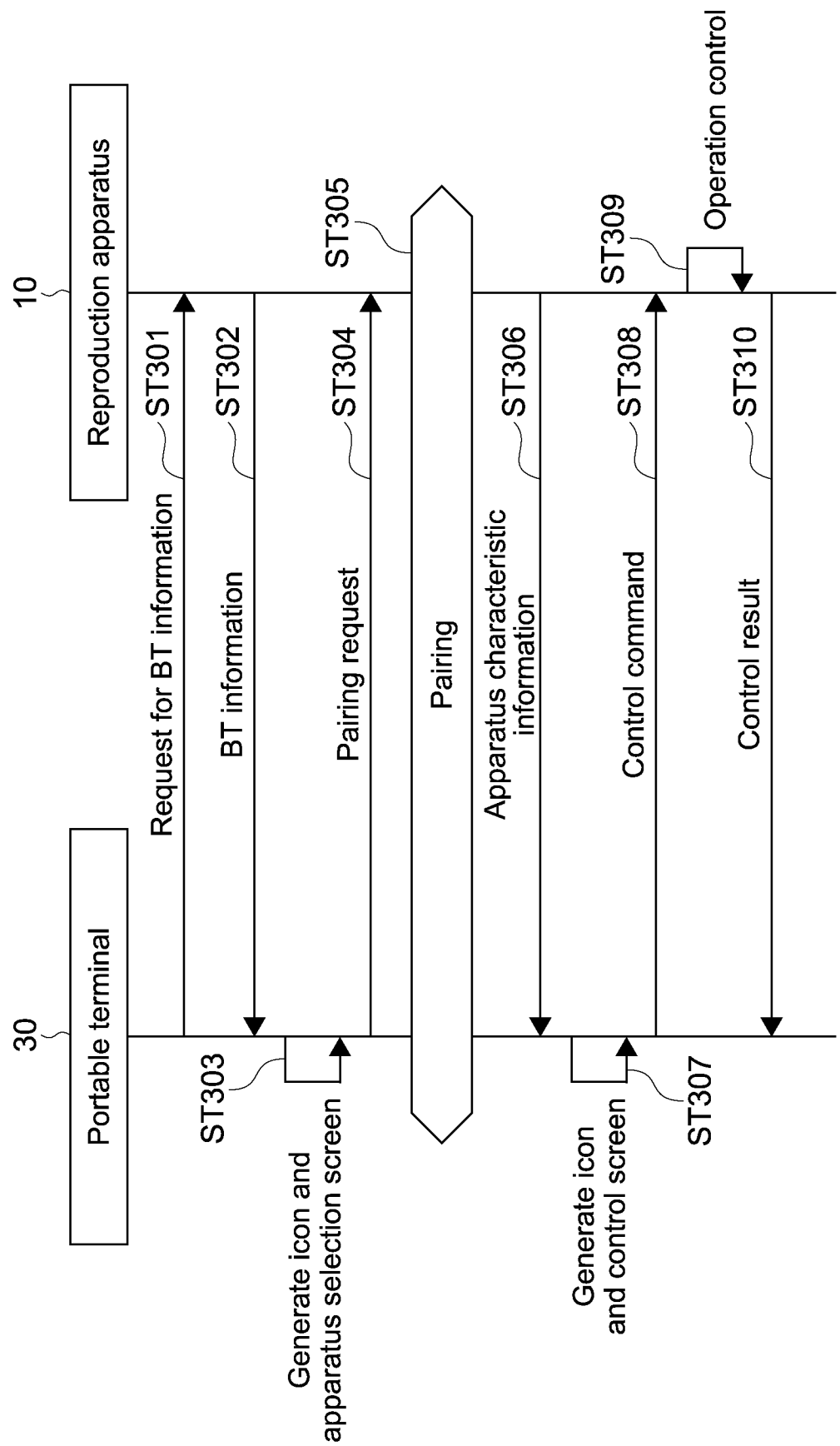
FIG. 6 is a sequence diagram showing an example of acquisition of apparatus characteristic information via BT communication.
Figure 7:
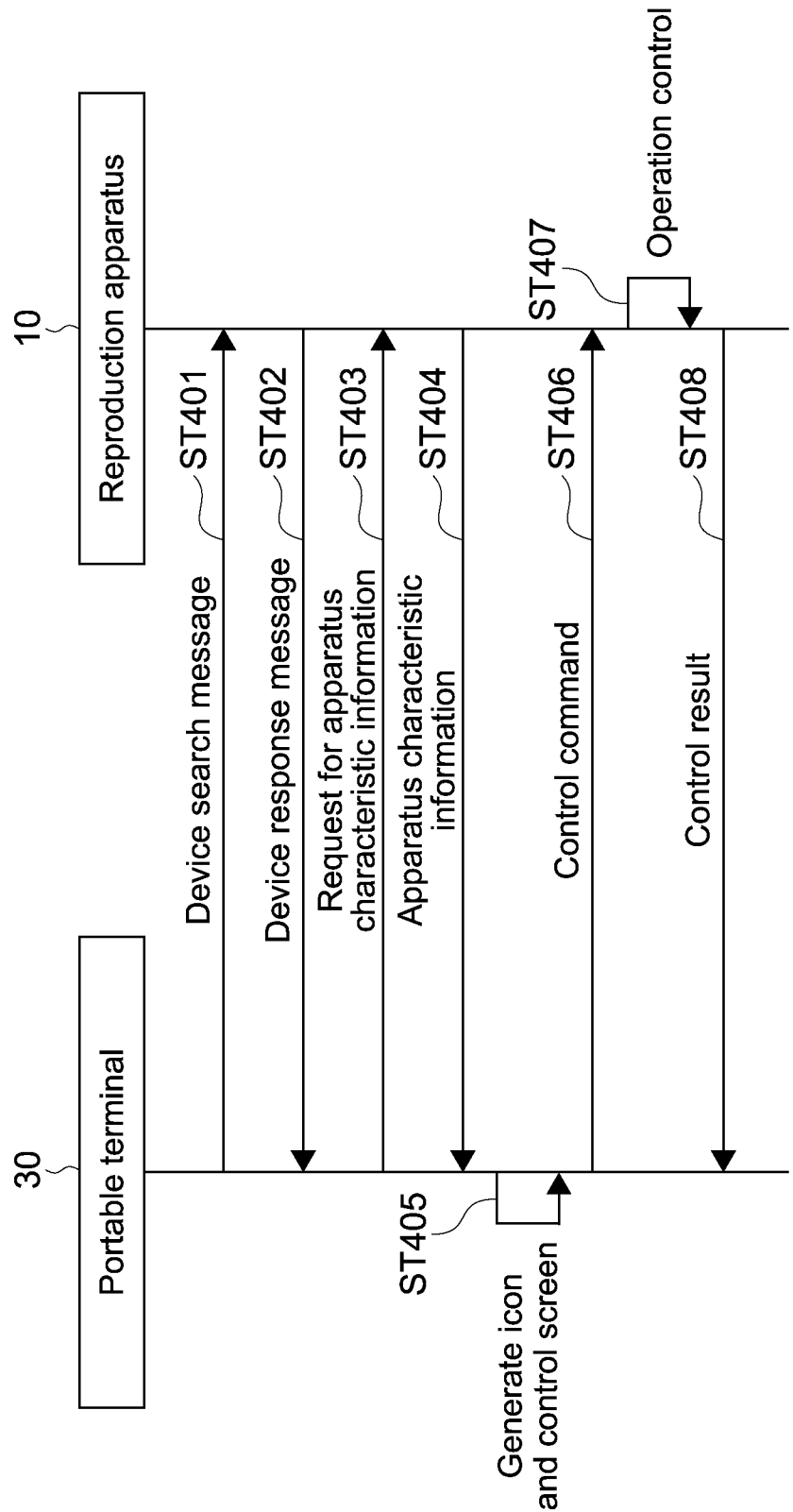
FIG. 7 is a sequence diagram showing an example of acquisition of apparatus characteristic information via a home network.

FIGS. 5 to 7 are sequence diagrams showing examples of acquisition of apparatus characteristic information via the BLE communication, the BT communication, and the home network 1, respectively. FIGS. 8 to 11 are schematic diagrams showing examples of an icon and a GUI generated on the basis of apparatus characteristic information.

As shown in FIG. 5, the reproduction apparatus 10 transmits the beacon signal 50 at predetermined intervals (Step 201). The beacon signal 50 includes apparatus information of the reproduction apparatus 10, a Bluetooth address, and the like. In this embodiment, the apparatus information includes color information of the reproduction apparatus 10 as the apparatus characteristic information.

The portable terminal 30 receives the beacon signal 50 and detects the reproduction apparatus 10. Then, the portable terminal 30 generates an apparatus selection screen including an icon of the detected reproduction apparatus 10 (step 202).

Figure 8:
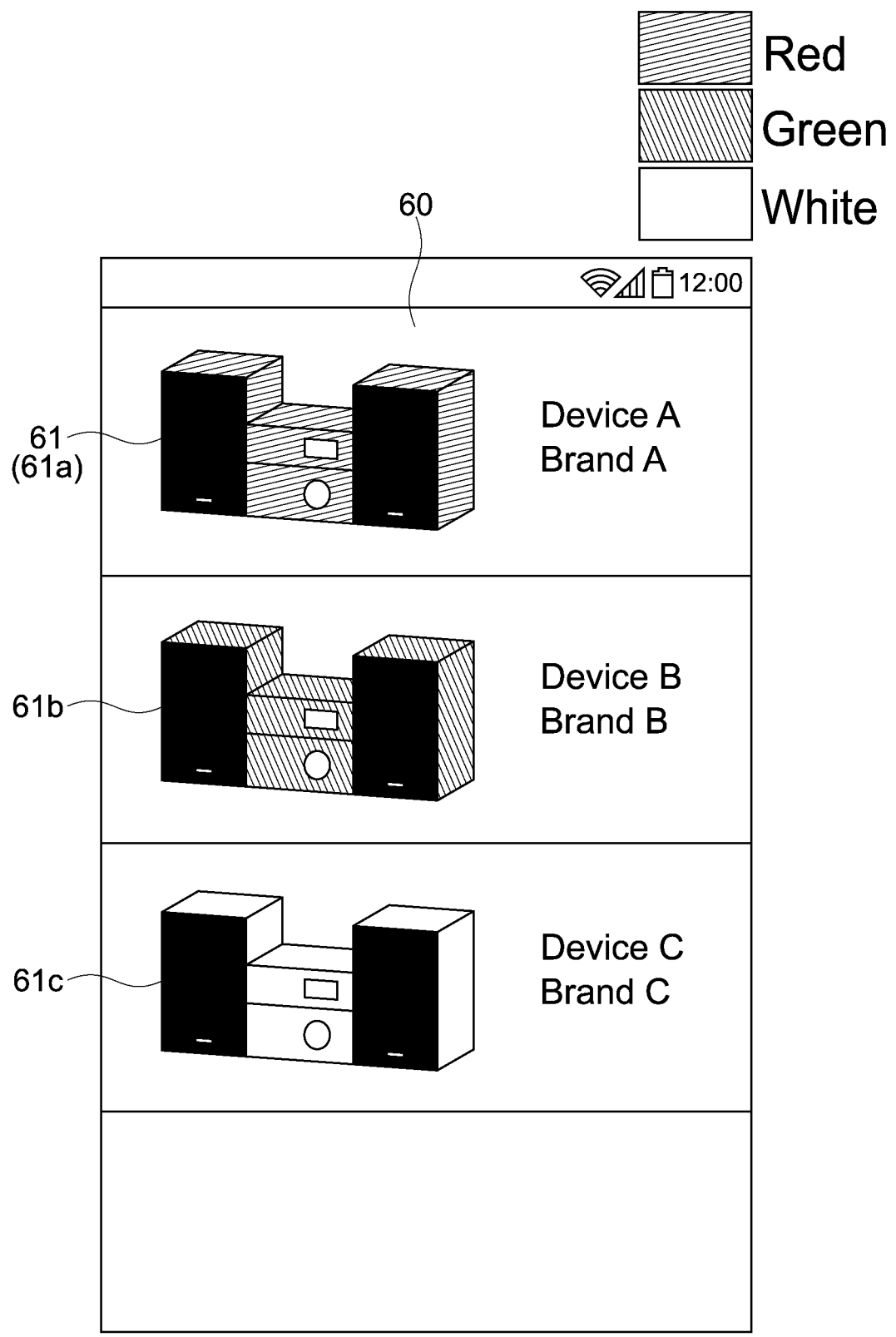
FIG. 8 is a schematic diagram showing a configuration example of an apparatus selection screen.

FIG. 8 is a schematic diagram showing a configuration example of an apparatus selection screen 60. On the apparatus selection screen 60, one or more reproduction apparatuses 10 detected by the portable terminal 30 are displayed in a list. In this embodiment, an icon 61, an apparatus name, and a brand name of the reproduction apparatus 10 are displayed.

As shown in FIG. 8, a color is applied to the icon 61 of the reproduction apparatus 10. The exterior color of an icon 61a of a device A is red (Red), and the exterior color of an icon 61b of a device B is green (Green). Further, the exterior color of an icon 61C of a device C is white (White). The color of the icon 61 is determined on the basis of color information of the reproduction apparatus 10 output from the reproduction apparatus 10. That is, in this embodiment, the icon 61 reflecting the color of the reproduction apparatus 10 is generated.

For example, color designation information such as "Red 1", "Red 2", . . . , "Green 1", "Green 2", . . . , "Blue 1", "Blue 2", . . . is output from the reproduction apparatus 10 as apparatus characteristic information. Typically, the color designation information is stored in the memory or the like of the reproduction advance 10 in advance. Alternatively, the color designation information may be set later by a user.

A color table in which color designation information and color information are associated with each other is stored in the ROM 32 or the like of the portable terminal 30. The image generation unit 44 of the portable terminal 30 refers to the color table and reads color information corresponding to the received color designation information. Then, the image generation unit 44 generates the icon 61 reflecting the color on the basis of the read color information. A color code of HTML or the like is used as the color information, but the color information is not limited to the color code.

Color information such as a color code may be directly output from the reproduction apparatus 10 as apparatus characteristic information. In addition, the method of transmitting color information, the data format to be used, and the like may be arbitrarily set.

Note that "reflecting the color of the reproduction apparatus 10" is not limited to the case where strictly the same color as the color of the reproduction apparatus 10 is used, and also includes the case where a color similar to the color of the reproduction apparatus 10 is used. In the present disclosure, the concept including both strictly the same color and similar colors is described as "substantially the same color".

When the reproduction apparatus 10 in the apparatus selection screen 60 is selected, a request for BLE connection is transmitted from the portable terminal 30 to the selected reproduction apparatus 10 (Step 203). By responding to the request, the portable terminal 30 and the reproduction apparatus 10 enter a BLE connection state, and the BLE communication (arrow N in FIG. 3) is established (Step 204).

Note that the mode of the BLE connection may be either a mode of executing pairing or a mode of connecting without pairing. The BLE connection shown in FIG. 5 includes both connection with pairing and connection without pairing. Note that when pairing is executed, passkey authentication or the like is executed between the portable terminal 30 and the reproduction apparatus 10 (illustration is omitted).

When the BLE connection is established, the portable terminal 30 is capable of controlling the reproduction apparatus 10. For example, various kinds of control such as power control (e.g., switching between the standby state and the active state) of the reproduction apparatus 10, control of the reproduction volume of content, switching of content to be reproduced, and fade in and fade out of content can be performed.

In this embodiment, the image generation unit 44 generates various GUIs (control screens) for controlling the reproduction apparatus 10 (Step 205). A control command is generated according to an operation input via the GUI and transmitted to the reproduction apparatus 10 (Step 206). The operation of the reproduction apparatus 10 is controlled on the basis of the control command, and the result of the control is fed back to the portable terminal 30 (Steps 207 and 208).

Figure 9:
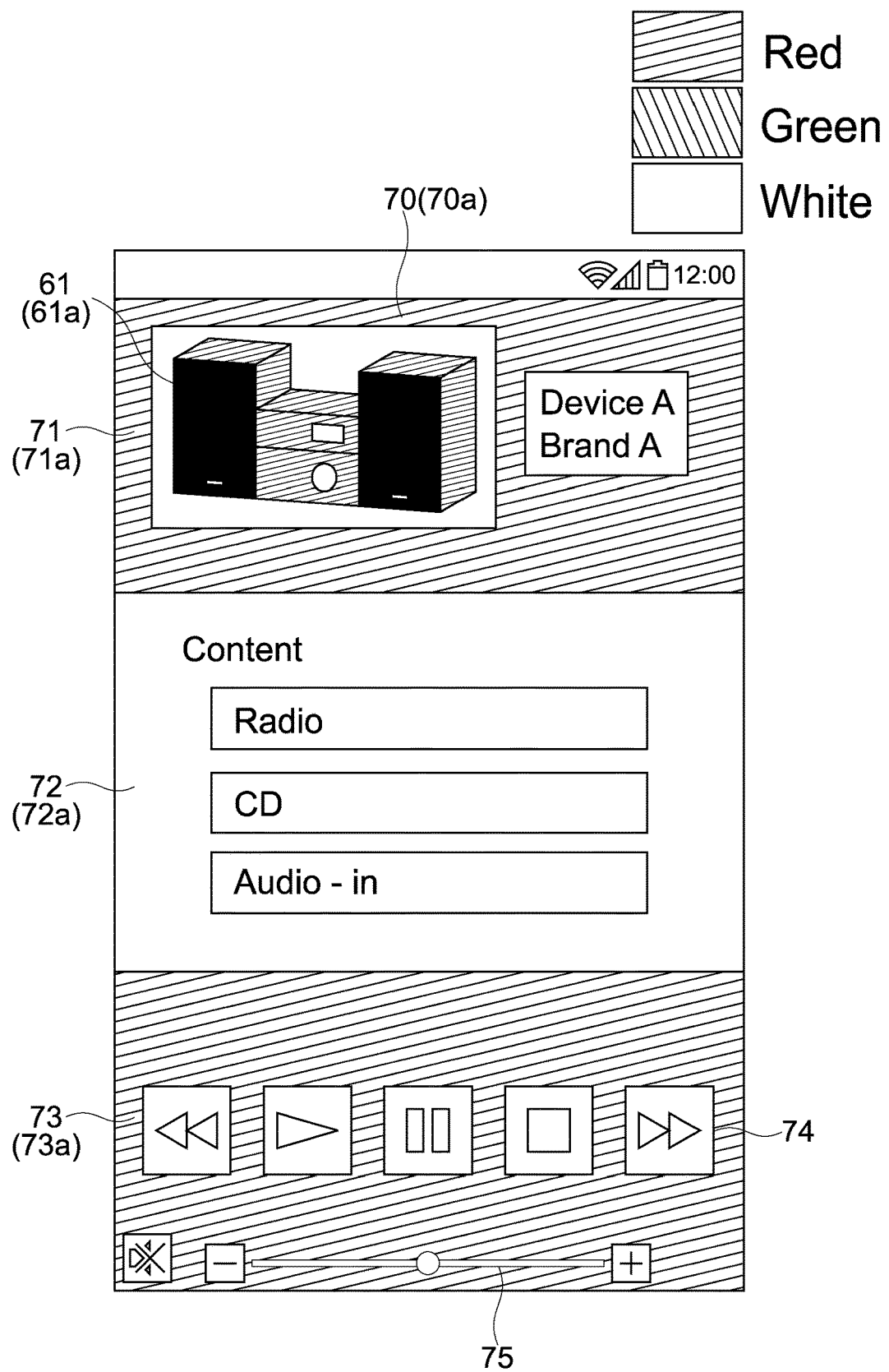
FIG. 9 is a schematic diagram showing a configuration example of a GUI for control.
Figure 10:
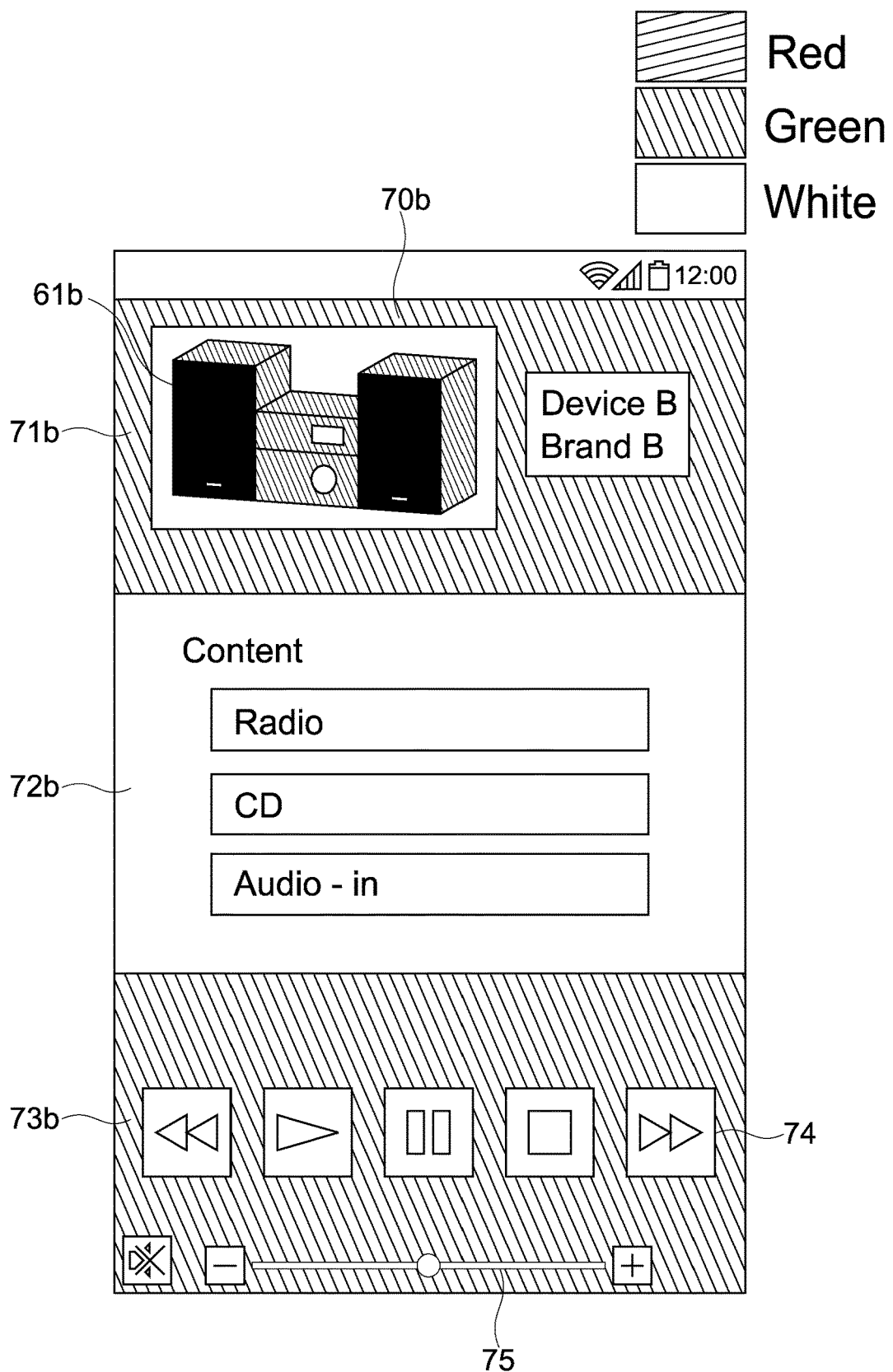
FIG. 10 is a schematic diagram showing a configuration example of a GUI for control.
Figure 11:
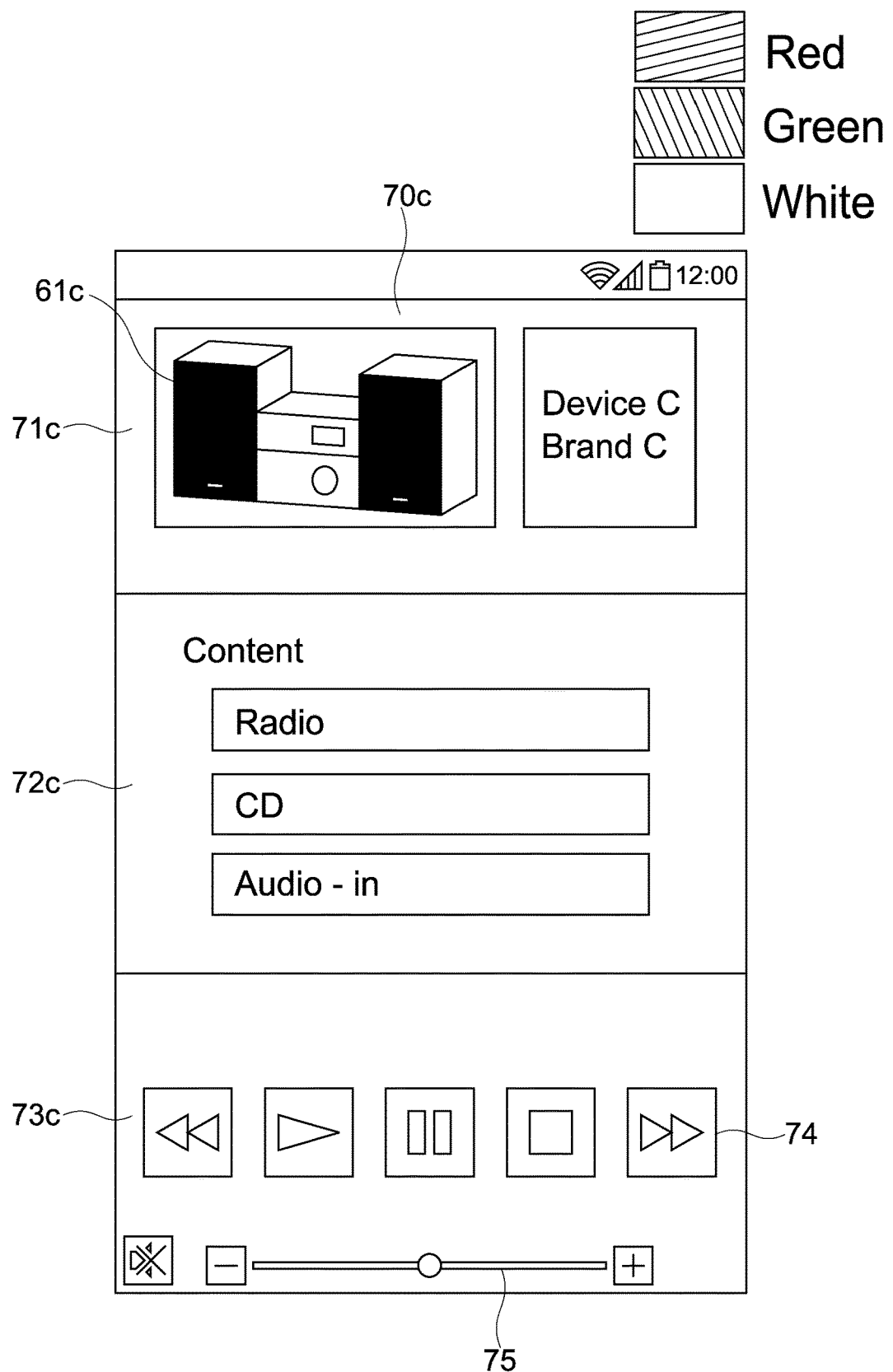
FIG. 11 is a schematic diagram showing a configuration example of a GUI for control.

FIGS. 9 to 11 are each a schematic diagram showing a configuration example of a GUI for control. A control screen 70 shown in FIGS. 9 to 11 is a GUI for controlling each of the devices A to C shown in FIG. 8. In this embodiment, a GUI reflecting the color of the reproduction apparatus 10 is generated. Specifically, control screens 70a to 70c each having a background color that is substantially the same as the color of the reproduction apparatus 10 are generated.

Each control screen 70 includes an apparatus display unit 71, an information display unit 72, and a reproduction control unit 73. On the apparatus display unit 71, the icon 61, the apparatus name, and the brand name of the reproduction apparatus 10 to be controlled are displayed. The color of the reproduction apparatus 10 is reflected on the icon 61.

On the information display unit 72, various kinds of information relating to reproduction of content are displayed. In the examples shown in FIGS. 9 to 11, the kind of content to be reproduced is selectably displayed. In addition, various kinds of information such as detailed information of the selected content and setting information of the reproduction apparatus 10 are displayed on the information display unit 72.

A plurality of control buttons 74 and a volume adjustment bar 75 are displayed on the reproduction control unit 73. It is possible to control reproduction of content by the reproduction apparatus 10 by operating the reproduction control unit 73.

In this embodiment, a color substantially the same as the color of the reproduction apparatus 10 is employed as background colors of the apparatus display unit 71 and the reproduction control unit 73 of each control screen 70. A red color (Red) is employed as the background color of the control screen 70a of the device A, and a green color (Green) is employed as the background color of the control screen 70b of the device B. Further, a white color (White) is employed as the background color of the control screen 70c of the device C. Note that the "background color of the screen" includes not only the color applied to the entire background of the screen but also the color applied to a part of the background.

The configuration of the control screen 70 reflecting the color of the reproduction apparatus 10 is not limited and may be arbitrarily designed. For example, a frame having a color substantially the same as the color of the reproduction apparatus 10 may be displayed so as to surround the control screen 70. Alternatively, an icon having a predetermined shape and a color substantially the same as the color of the reproduction apparatus 10 may be displayed at a predetermined position on the control screen 70. It can be also said that these configurations are each a configuration having a background color substantially the same as the color of the reproduction apparatus 10. In any case, a screen configuration or an expression method in which the color of the reproduction apparatus 10 can be spontaneously recognized may be appropriately employed.

By displaying the control screen 70 reflecting the color of the reproduction apparatus 10, it becomes possible to easily know the reproduction apparatus 10 to be controlled. Further, assumption is made that the screen is switched to one of the control screens 70a to 70c for controlling the corresponding reproduction apparatus 10 from the apparatus selection screen 60 shown in FIG. 8, for example. Since the same color is reflected in such a case, it is possible to cause a user to feel a sense of unity of colors, and exert a very high operability.

In the BT communication shown in FIG. 6, a request for BT information is transmitted by broadcasting from the portable terminal 30 (Step 301). In the case where there is the reproduction apparatus 10 in the pairing mode in the vicinity of the portable terminal 30, the reproduction apparatus 10 returns BT information (Step 302). The BT information includes apparatus information and a Bluetooth address but does not include apparatus characteristic information.

The portable terminal 30 detects the reproduction apparatus 10 on the basis of the BT information transmitted from the reproduction apparatus 10. Then, the portable terminal 30 generates an apparatus selection screen including the icon of the detected reproduction apparatus 10 (Step 303). In this case, an icon in which the color of the reproduction apparatus 10 is not reflected is generated and displayed. Typically, a predefined default icon is used.

When the reproduction apparatus 10 in the apparatus selection screen is selected, a pairing request is transmitted from the portable terminal 30 to the selected reproduction apparatus 10 (Step 304). By responding to the request, the portable terminal 30 and the reproduction apparatus 10 enter a pairing state (illustration of passkey authentication and the like is omitted) (Step 305).

After pairing is executed, color information of the reproduction apparatus 10 is transmitted as apparatus characteristic information from the reproduction apparatus 10 (Step 306). The icon and various GUIs for control (see FIGS. 8 to 11) reflecting the color of the reproduction apparatus 10 are generated on the basis of the color information of the reproduction apparatus 10 (Step 307). It is possible to control, with a high operability, the reproduction apparatus 10 via these images (Steps 308 to 310).

In the network communication shown in FIG. 7, a device search message (M-SEARCH message) is transmitted from the portable terminal 30 by multicast (Step 401). In response to the device search message, the reproduction apparatus 10 connected to the home network 1 returns a device response message (M-SEARCH message) (step 402). As a result, the reproduction apparatus 10 is detected.

The portable terminal 30 requests the apparatus information and the function information of the reproduction apparatus 10. For example, a request message generated using a method such as HTTP GET is used.

In this embodiment, apparatus information including apparatus characteristic information is requested (Step 403). The reproduction apparatus 10 returns the apparatus information including the apparatus characteristic information, and the function information (Step 404).

An icon and various GUIs for control (see FIGS. 8 to 11) reflecting the color of the reproduction apparatus 10 are generated on the basis of the apparatus characteristic information (Step 405). It is possible to control, with a high operability, the reproduction apparatus 10 via these images (Steps 406 to 408).

Note that a predetermined default icon and a predetermined GUI for control are generated and displayed for the reproduction apparatus 10 from which no apparatus characteristic information can be acquired. This makes it possible to maintain a user's high operability.

As described above, in the content reproduction system 100 according to this embodiment, an image reflecting the characteristics of the reproduction apparatus 10 is displayed on the basis of the apparatus characteristic information output from the reproduction apparatus 10. As a result, it becomes possible to easily know the reproduction apparatus 10 to be controlled, and control, with good operability, the reproduction apparatus 10.

For example, by generating an icon and a control screen reflecting the exterior color of the reproduction apparatus 10, it is possible to establish an operation screen with a sense of unity. Further, it is possible to establish an operation screen with high contrast, which is very easy to see. Note that it is also possible to improve the contrast of the screen by appropriately adjusting the color of the icon and the background color. For example, it is also possible to improve the contrast by changing the chromaticity, chroma, and the like between the red color (Red) of the icon and the red color (Red) of the background color in the apparatus display unit 71 of the control screen 70a shown in FIG. 9.

Further, according to the present disclosure, it is possible to eliminate the trouble of the user himself/herself to change the color of the icon or the GUI, and the user does not need to learn the method of changing the color, and the like. In this respect as well, it is possible to exert a high operability.

<Other Embodiments>

The present disclosure is not limited to the above-mentioned embodiments, and various other embodiments can be realized.

Figure 12:
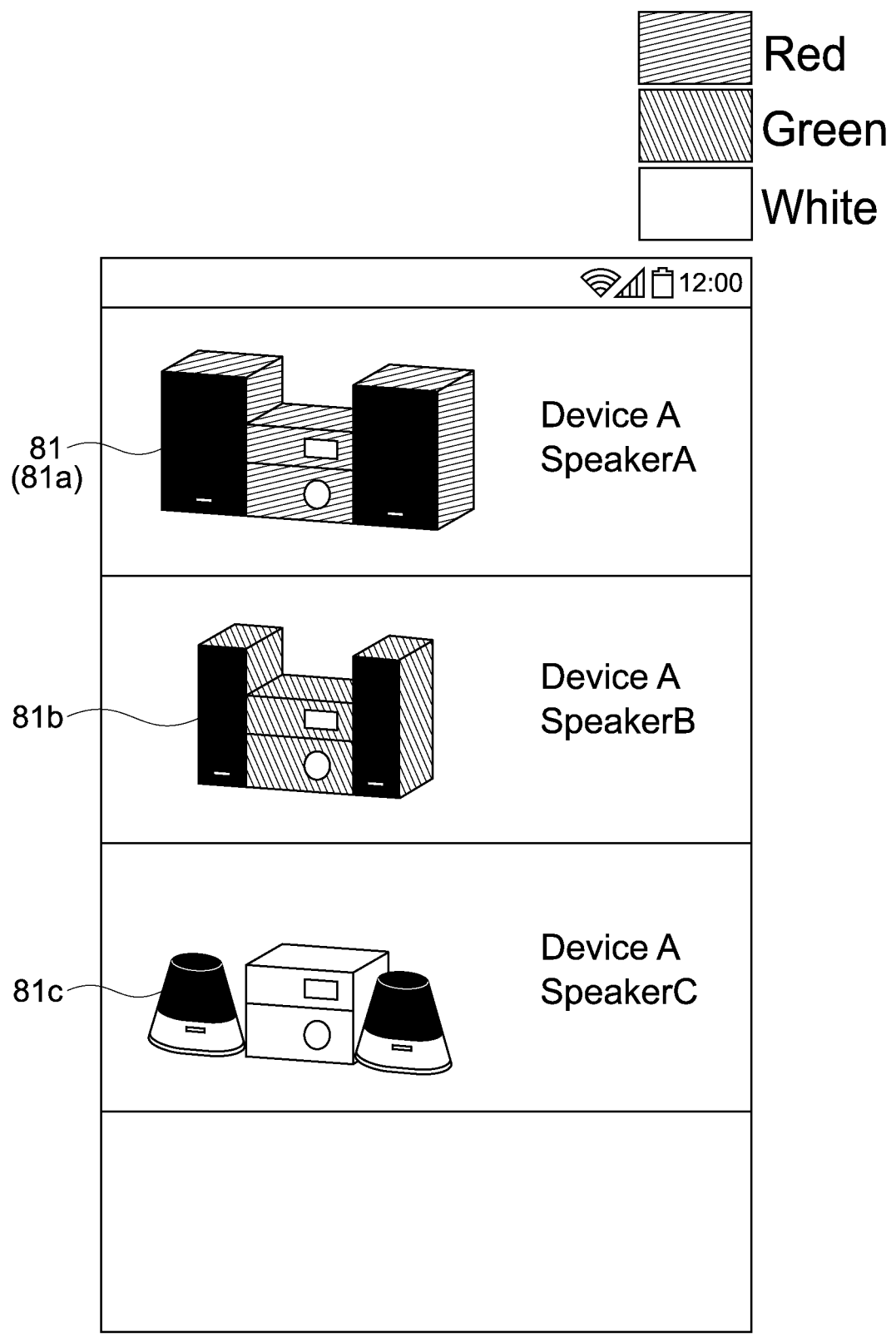
FIG. 12 is a schematic diagram showing a configuration example of an apparatus selection screen according to another embodiment.

FIG. 12 is a schematic diagram showing a configuration example of an apparatus selection screen according to another embodiment. In this embodiment, system information of the reproduction apparatus 10 is acquired as apparatus characteristic information. The system information of the reproduction apparatus 10 includes information on functional parts constituting the reproduction apparatus 10, such as a speaker and an amplifier. On the basis of these pieces of information, an icon and various GUIs reflecting the system information, i.e., the information on each functional part, are generated.

In the example shown in FIG. 12, icons 81a to 81c of the reproduction apparatus 10 in which a different speaker is connected to the same device A are displayed. A speaker A is connected to the top red device A. A speaker B is connected to the middle green device A. A speaker C is connected to the bottom device A. These icons 81a to 81c are generated on the basis of information on the speaker acquired as apparatus characteristic information.

As described above, in this embodiment, the icon 81 reflecting system information of the reproduction apparatus 10 is generated and displayed. For example, a user often customizes the speaker and the like of the reproduction apparatus 10. In this embodiment, the customized speaker is displayed as an icon. As a result, it becomes possible to easily know the reproduction apparatus 10 to be controlled, and control, with a very high operability, the reproduction apparatus 10.

Note that the apparatus characteristic information is not limited to the color or system of the reproduction apparatus. Information on arbitrary characteristics of the reproduction apparatus may be used as the apparatus characteristic information. Further, various kinds of apparatus information and function information relating to the reproduction apparatus may be used as the apparatus characteristic information.

For example, the model name of the reproduction apparatus may include color information of the reproduction apparatus. For example, "device A(R)" or the like may be applied as the model name of the reproduction apparatus whose exterior color is red. "(R)" in the model name is a character representing red. Such a model name may be used as apparatus characteristic information, and an icon or GUI reflecting the color of the reproduction apparatus may be generated. That is, apparatus characteristic information may be generated as independent metadata, or other apparatus information or the like may be used as apparatus characteristic information.

In the case where the icon generated on the basis of the apparatus characteristic information is used for a group state image that is a GUI for controlling multi-room reproduction, it is possible to newly create a group, dissolve the group, make a new addition to the group, withdraw from the group, and the like, with a very high operability.

In the above description, the case where the information processing method according to an embodiment of the present disclosure is executed by a computer such as a portable terminal operated by a user has been described. However, the information processing method and the program according to an embodiment of the present disclosure may be executed by a computer operated by a user and another computer capable of communicating with the computer via a network or the like. Further, a content reproduction system according to an embodiment of the present disclosure may be established in cooperation with a computer operated by a user and another computer.

That is, the information processing method and the program according to an embodiment of the present disclosure can be executed not only in a computer system including a single computer but also in a computer system in which a plurality of computers operate in conjunction with each other. Note that in the present disclosure, the "system" means a group of a plurality of components (apparatuses, modules (parts), etc.), and it does not matter whether or not all the components are in the same casing. Therefore, a plurality of apparatuses that are housed in separate casings and connected via a network, and a single apparatus in which a plurality of modules are housed in one casing are each a system.

The execution of the information processing method and the program according to an embodiment of the present disclosure by a computer system includes, for example, the case where acquisition of apparatus characteristic information and generation of an image reflecting the characteristics of the reproduction apparatus are executed by a single computer and the case where each processing is executed by a different computer. Further, the execution of each processing by a predetermined computer includes executing, by another computer, a part or all of the processing and acquiring the result.

That is, the information processing method and the program according to an embodiment of the present disclosure can also be applied to a configuration of cloud computing in which one function is shared by a plurality of apparatuses via a network and processed by the plurality of apparatuses in cooperation with each other.

At least two feature parts of the feature parts of the present disclosure described above can also be combined. That is, various feature parts described in each embodiment may be arbitrarily combined without distinguishing the embodiments with each other. Further, the various effect described above are merely an example and not limited, and another effect may be exerted.

Note that, the present disclosure may also take the following configurations.

(1) An information processing apparatus, including:

an acquisition unit configured to acquire apparatus characteristic information output from a reproduction apparatus; and a generation unit configured to generate an image reflecting characteristics of the reproduction apparatus on the basis of the acquired apparatus characteristic information.

(2) The information processing apparatus according to (1), in which the apparatus characteristic information includes a color of the reproduction apparatus, and the generation unit generates an icon of the reproduction apparatus, the icon reflecting the color of the reproduction apparatus.

(3) The information processing apparatus according to (1) or (2), in which the apparatus characteristic information includes a color of the reproduction apparatus, and the generation unit generates a GUI (Graphical User Interface) for controlling the reproduction apparatus, the GUI reflecting the color of the reproduction apparatus.

(4) The information processing apparatus according to (3), in which the generation unit generates a control screen having a background color substantially the same as the color of the reproduction apparatus.

(5) The information processing apparatus according to any one of (1) to (4), in which the apparatus characteristic information includes system information of the reproduction apparatus, and the generation unit generates an icon of the reproduction apparatus, the icon reflecting the system information of the reproduction apparatus.

(6) The information processing apparatus according to (5), in which the system information includes information on a functional part constituting the reproduction apparatus, and the generation unit generates an icon of the reproduction apparatus, the icon reflecting the information on the functional part.

(7) The information processing apparatus according to (6), in which the information on the functional part includes information on a speaker, and the generation unit generates an icon of the reproduction apparatus, the icon reflecting the information on the speaker.

(8) The information processing apparatus according to any one of (1) to (7), in which the generation unit generates a predetermined image for the reproduction apparatus from which no apparatus characteristic information can be acquired.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system comprising:
   a processor; and
   a computer-readable storage medium storing computer-readable instructions, which when executed by the processor, cause the processor to:
      acquire, with an acquisition unit, first apparatus characteristic information output from a first reproduction apparatus and second apparatus characteristic information output from a second reproduction apparatus, wherein the first apparatus characteristic information is associated with a first color associated with the first reproduction apparatus and the second apparatus characteristic information is associated with a second color associated with the second reproduction apparatus, wherein the first color is different from the second color;
      based on the first apparatus characteristic information, generate, with a generation unit, a first image, wherein the first image is the first color;
      based on the second apparatus characteristic information, generate, with the generation unit, a second image, wherein the second image is the second color;
      display, on a user interface, a first graphical user interface icon including the first image and a second graphical user interface icon the second image including the second image;
      detect a third reproduction apparatus;
      determine the acquisition unit is incapable of acquiring apparatus characteristic information for the third reproduction apparatus; and
      based on the determination that the acquisition unit is incapable of acquiring apparatus characteristic information for the third reproduction apparatus, generate a predetermined image for the third reproduction apparatus.

2. The information processing system according to claim 1, wherein
   the generation unit generates a control screen having a background color substantially the same as the first color associated with the first reproduction apparatus.

3. The information processing system according to claim 1, wherein
   the first apparatus characteristic information includes system information of the first reproduction apparatus, and
   the first graphical user interface icon further reflects the system information of the first reproduction apparatus.

4. The information processing system according to claim 3, wherein
   the system information includes information associated with a functional part constituting the first reproduction apparatus, and
   the first graphical user interface icon further reflects the information on the functional part.

5. The information processing system according to claim 4, wherein
   the information associated with the functional part includes information associated with a speaker, and
   the first graphical user interface icon further reflects the information on the speaker.

6. An information processing method executed by a computer system, the information processing method comprising:
   acquiring, with a processor of the computer system, first apparatus characteristic information output from a first reproduction apparatus and second apparatus characteristic information output from a second reproduction apparatus, wherein the first apparatus characteristic information is associated with a first color associated with the first reproduction apparatus and the second apparatus characteristic information is associated with a second color associated with the second reproduction apparatus, wherein the first color is different from the second color;
   based on the first apparatus characteristic information, generating, with the processor, a first image, wherein the first image is the first color;
   based on the second apparatus characteristic information, generating, with the processor, a second image, wherein the second image is the second color;
   displaying, on a user interface, a first graphical user interface icon including the first image and a second graphical user interface icon the second image including the second image;
   detecting a third reproduction apparatus;
   determining the acquisition unit is incapable of acquiring apparatus characteristic information for the third reproduction apparatus; and
   based on the determination that the acquisition unit is incapable of acquiring apparatus characteristic information for the third reproduction apparatus, generating a predetermined image for the third reproduction apparatus.

7. The information processing method according to claim 6, further comprising generating, with the processor, a control screen having a background color substantially the same as the first color associated with the first reproduction apparatus.

8. The information processing method according to claim 6, wherein
   the first apparatus characteristic information includes system information of the first reproduction apparatus, and
   the first graphical user interface icon reflects the system information of the reproduction apparatus.

9. The information processing method according to claim 8, wherein
   the system information includes information associated with a functional part constituting the first reproduction apparatus, and
   the first graphical user interface icon further reflects the information on the functional part.

10. The information processing method according to claim 9, wherein
    the information associated with the functional part includes information associated with a speaker, and
    the first graphical user interface icon further reflects the information on the speaker.

11. A non-transitory computer-readable recording medium storing a program causing a processor of a computer system to execute a method comprising:
    acquiring first apparatus characteristic information output from a first reproduction apparatus and second apparatus characteristic information output from a second reproduction apparatus, wherein the first apparatus characteristic information is associated with a color associated with the first reproduction apparatus and the second apparatus characteristic information is associated with a second color associated with the second reproduction apparatus, wherein the first color is different from the second color;

based on the first apparatus characteristic information, generating a first image, wherein the first image is the first color;

based on the second apparatus characteristic information, generating a second image, wherein the second image is the second color; and displaying, on a user interface, a first graphical user interface icon including the first image and a second graphical user interface icon the second image including the second image;

detecting a third reproduction apparatus;

determining the acquisition unit is incapable of acquiring apparatus characteristic information for the third reproduction apparatus; and based on the determination that the acquisition unit is incapable of acquiring apparatus characteristic information for the third reproduction apparatus, generating a predetermined image for the third reproduction apparatus.

12. The non-transitory computer-readable recording medium according to claim 11, wherein the method further comprises generating a control screen having a background color substantially the same as the color associated with the first reproduction apparatus.

13. The non-transitory computer-readable recording medium according to claim 11, wherein the first apparatus characteristic information includes system information of the first reproduction apparatus, and the icon reflects the system information of the first reproduction apparatus.

14. The non-transitory computer-readable recording medium according to claim 13, wherein the system information includes information associated with a functional part constituting the first reproduction apparatus, and the first graphical user interface icon reflects the information on the functional part.

15. The non-transitory computer-readable recording medium according to claim 14, wherein the information associated with the functional part includes information associated with a speaker, and the first graphical user interface icon reflects the information on the speaker.

16. An information processing system, comprising:
a processor; and
a computer-readable storage medium storing computer-readable instructions, which when executed by the processor, cause the processor to:
execute an acquisition unit configured to acquire first apparatus characteristic information from a first reproduction apparatus and second apparatus characteristic information from a second reproduction apparatus, wherein the first apparatus characteristic information is associated with a first color associated with the first reproduction apparatus and the second apparatus characteristic information is associated with a second color associated with the second reproduction apparatus, wherein the first color is different from the second color;

detect a third reproduction apparatus;

determine the acquisition unit is incapable of acquiring apparatus characteristic information for the third reproduction apparatus;

based on the determination that the acquisition unit is incapable of acquiring apparatus characteristic information for the third reproduction apparatus, generate a predetermined image for the third reproduction apparatus; and execute a generation unit configured to generate a first image and a second image, wherein:
the first image is the first color,
the second image is the second color,
a first graphical user interface icon including the first image is displayed on a user interface, and
a second graphical user interface icon including the second image is displayed on the user interface.

17. The information processing system according to claim 16, wherein the generation unit further generates a control screen having a background color substantially the same as the first color associated with the first reproduction apparatus.

18. The information processing system according to claim 16, wherein
the first apparatus characteristic information includes system information of the first reproduction apparatus, and
the first graphical user interface icon further reflects the system information of the first reproduction apparatus.

19. The information processing system according to claim 18, wherein
the system information includes information associated with a functional part constituting the first reproduction apparatus, and
the first graphical user interface icon further reflects the information on the functional part.

20. The information processing system according to claim 19, wherein
the information associated with the functional part includes information associated with a speaker, and
the first graphical user interface icon further reflects the information on the speaker.

* * * * *